Nov. 22, 1966   K. STEISSLINGER   3,286,945
FILM MAGAZINE
Filed Sept. 14, 1964

KURT STEISSLINGER
INVENTOR.

BY R. Frank Smith
Malcolm G. Dunn
ATTORNEYS

൧

3,286,945
FILM MAGAZINE
Kurt Steisslinger, Stuttgart-Hedelfingen, Germany, assignor to Eastman Kodak Company, Rochester, N.Y., a corporation of New Jersey
Filed Sept. 14, 1964, Ser. No. 396,079
Claims priority, application Germany, Sept. 13, 1963, K 45,708
4 Claims. (Cl. 242—71.2)

The innovation relates to a film magazine with a preloaded film for insertion into a camera, with a film supply chamber and a film chamber for taking up the exposed film, both being spaced by a connection member and a locking device being provided to prevent the exposed film from uncoiling in the film chamber.

In reference to film containers with spools it is known to arrange, within the film spool container, a locking device between the film spool and the film container so that the film spool within the film container can be turned only in one direction. It is also known to provide the spool core of a roll film cassette with a device preventing its reverse motion. Known braking devices attached to magazines cooperate with means disposed at the camera so that, by the insertion of the cassette or the closing of the camera back, respectively, the braking effect on the film spool is neutralized. The arrangement of the locking device within the cassettes necessitates a rather complicated construction. Moreover, it is not possible to disengage the locking device or to release the brake, respectively, at any time this is desired.

It is the aim of the innovation, by a simple design and arrangement of the locking device, to do away with the short-comings of the known constructions. The film magazine consists of a front part and a cover, preferably made of plastic material. The front part is formed into a semi-cylinder closed at its ends, which semi-cylinder serves as the front wall of a film supply chamber; and is formed into a semi-cylinder which is open for receiving a film spool and which is provided with inwardly projecting ribs, which semi-cylinder serves as the front wall of a film chamber for the exposed film. Both semi-cylinders are connected by a front plate which is provided with an opening through which film may be exposed when drawn across from one chamber to the other. A locking or pawl and ratchet means is provided which prevents the exposed film from uncoiling in the film chamber. The locking means is disposed resiliently on the outside of the film magazine and may be attached to the front part or to the cover or to the spool of the film magazine. This disposition of the locking means on the outside of the film magazine makes it readily accessible. If the film magazine is desired to be used for demonstration purposes, the arrangement of the locking device or means serves to permit the release of the locking means and thus the film may be rewound into the film supply chamber by suitable means. Details of the invention may be taken from the description of several embodiments, without restriction thereto, as well as to the claims.

In the drawings which form a part of the disclosure of this invention:

Figure 1:
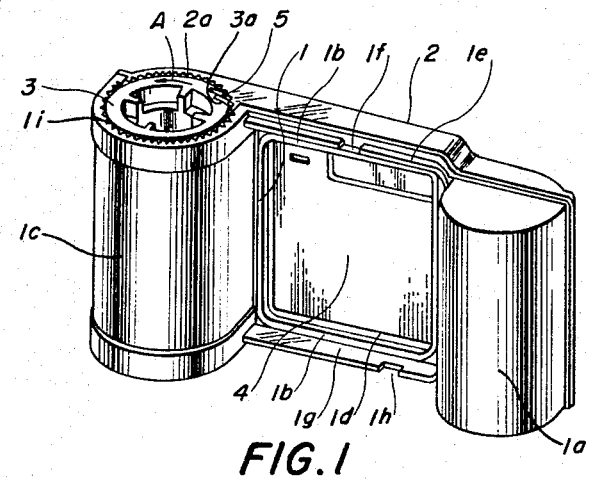
FIG. 1 is a perpsective view of the film magazine according to the invention, with the pawl of the locking means being a resilient part located on the take-up spool.
Figure 2:
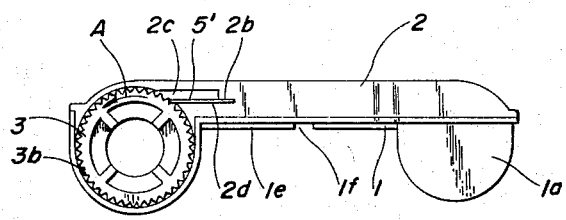
FIG. 2 is a top view of the film magazine according to FIG. 1, with the pawl of the locking means being a resilient part located on the magazine cover.
Figure 3:
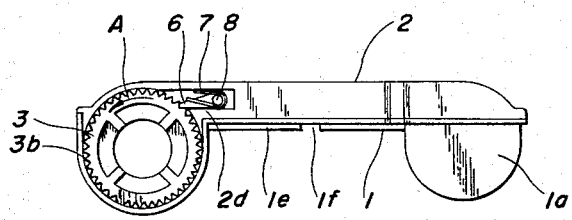
FIG. 3 is a top view of the film magazine according to FIG. 2, with a modified resilient part of the locking means being located on the magazine cover.
Figure 4:
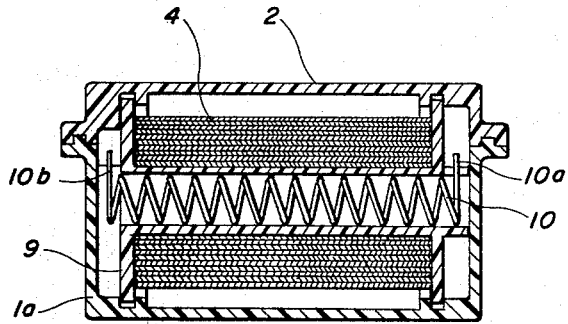
FIG. 4 is a sectional view disclosing a proposed manner for providing a spring within the film supply chamber for rewinding film into the chamber.

The film magazine shown in FIGS. 1 to 3 consists of the front part 1 and the cover 2 as well as the spool 3 which serves the purpose of taking up the exposed film 4. The film supply chamber 1a serves for receiving the unexposed film supply, preferably without a spool. If it should be desired that the film magazine be used for demonstration purposes, then a second spool 9 may be provided, as shown in FIG. 4, suitably connected to one end of a spring 10 at 10a, and the other end of the spring being suitably connected at 10b to the inside wall of the chamber. The illustration in FIG. 4 is only by way of example and further details of such construction may be obtained from copending U.S. application Serial No. 260,155, filed February 1, 1963. The film supply chamber 1a is formed like a semi-cylinder with closed ends. The film supply chamber 1a is connected by portions 1b—which at the same time form the front plate—with the film chamber 1c. The film chamber 1c houses the spool core 3 onto which the exposed film 4 is wound. Ribs provided at the film chamber 1c and at the cover 2 engage grooves (not shown) in a well-known manner in the spool 3, thus permitting light-tight seal while rotatably supporting the spool for free movement. The magazine, on both its front part 1 and at the cover 2 in the area of the slots (not shown) provided for the entrance and exit of the film, is formed in such a manner or may be provided with means which prevent entry of light. The exposure aperture 1d is arranged in the front part 1 between the film supply chamber and the film chamber 1a, 1c.

The outer measurements of the film magazine, for instance, the smaller diameter and length of the film supply chamber 1a as compared to the film chamber 1c, are so chosen that the magazine can be inserted into the camera only in such a manner that, upon operation of a film transport device, the film 4 is moved out of the film supply chamber 1a and fed into the film chamber 1c. A rib 1e which is arranged at the front plate of the magazine is provided with a notch 1f, the position of which depends on the sensitivity of the film material loaded in the magazine. For the purpose of considering the film sensitivity, this notch 1f is scanned by members of the camera for adjusting and/or setting the exposure. In a second rib 1g, there is a notch 1h, which permits automatic sorting of the film magazines in the film processing laboratory.

In the film magazine of the embodiment illustrated in FIG. 1, resilient part 5 or pawl is located on the flange of the spool 3 and cooperates with the toothing 1i at the front part 1 and the toothing 2a at the cover thereby constituting a pawl and ratchet means permitting the spool 3 to be turned only in the winding-up direction (arrow A). Thus, when taking a magazine with a fully or partly exposed film out of the camera, a double exposure of the exposed film 4 is safely prevented. Moreover, this design makes it unnecessary to actuate the film advance several times prior to the actual advance of the film once the film magazine is replaced within the camera. The notch 3a in the flange of the spool 3 permits, due to the arrangement of the pawl 5, such as a flat spring which is disposed on the outside of the magazine, the disengagement of the pawl and ratchet means for certain purposes. This can be desirable for instance, when the film magazine is used for demonstration purposes. The demonstration magazine may be in the manner shown in FIG. 4 wherein the film in the film supply chamber is disclosed as being wound on a spool 9 which, as it turns upon the unwinding of the film, tension spring 10 (suitably connected at its ends 10a, 10b) which—after the disengagement of the pawl 5 from the toothing 1i, 2a, or in reference to the embodiments shown in FIGS. 2 and 3, from the toothing 3b—rewinds the film into the film supply chamber.

The magazine of the embodiment depicted in FIG. 2 differs from that of FIG. 1 only by the arrangement of the pawl and ratchet means. The pawl 5, a resilient part, is fixed at 2b to cover 2. The depression 2c, permits the locking device to yield with respect to the toothing 3b formed in the periphery of the spool flange when the film is advanced in the direction of arrow A. Any attempt to turn the spool 3 in the opposite direction of arrow A would cause the pawl 5 to engage surface 2d, thus safely preventing any movement of the spool 3 in this direction. In order to facilitate a desired release of the pawl, the upper edge of the pawl should preferably slightly extend over the periphery of magazine cover 2.

A further embodiment is shown in FIG. 3. The locking means or pawl and ratchet means is formed by a detent 6 which, mounted rotatably on bolt 8, is biased by spring 7 in the direction of the face 2d and is thus pressed into the toothing 3b formed in the periphery of the spool flange. The function of this arrangement is identical with the one depicted in FIGS. 2 and 1.

The invention has been described in detail with particular reference to preferred embodiments thereof, but it will be understood that variations and modifications can be effected within the spirit and scope of the invention as described hereinabove and as defined in the appended claims.

I claim:
1. A film magazine comprising:
   a front part formed into a semi-cylinder closed at its ends which serve as the front wall of a film supply chamber and into a semi-cylinder which serves as the front wall of a film chamber for housing exposed film;
   said film chamber being open and having a film spool disposed therein, said spool being provided with at least one flange and being rotatably supported in said film chamber;
   both said semi-cylinders being connected by a front plate having an opening through which film may be exposed when drawn across from one chamber to the other;
   a cover for light-tightly closing the open side of said front part, and
   cooperating pawl means and ratchet means disposed between said spool flange and said film chamber and accessibly located on the outside of said film magazine for releasably preventing clock-springing of the exposed film within said film chamber in the unwind direction.

2. A film magazine as defined in claim 1 wherein said pawl means is disposed on the outside surface of said spool flange and said ratchet means comprises toothing formed within said front part and cover adjacent said spool flange.

3. A film magazine as defined in claim 1 wherein said pawl means is disposed on the outside surface of said cover adjacent said spool flange and said ratchet means comprises toothing formed in the periphery of said spool flange.

4. A film magazine as defined in claim 1 wherein a spool and spring is provided within the film supply chamber for rewinding the film within said film supply chamber up release of said cooperating pawl means from said ratchet means.

References Cited by the Examiner

UNITED STATES PATENTS

| | | | |
|---|---|---|---|
| 579,949 | 4/1897 | Brownell. | |
| 1,217,444 | 2/1917 | Hardy | 242—71.6 |
| 1,428,395 | 9/1922 | Pautler | 242—71.6 |
| 3,138,081 | 6/1964 | Nerwin | 242—71.2 X |

FRANK J. COHEN, *Primary Examiner.*

MERVIN STEIN, *Examiner*

N. L. MINTZ, *Assistant Examiner.*

UNITED STATES PATENT OFFICE
CERTIFICATE OF CORRECTION

Patent No. 3,286,945                          November 22, 1966

Kurt Steisslinger

It is hereby certified that error appears in the above numbered patent requiring correction and that the said Letters Patent should read as corrected below.

Column 2, line 52, after "cover" insert -- 2--; column 3, line 13, after "engage" insert -- the --; column 4, line 26, for "up" read -- upon --.

Signed and sealed this 12th day of September 1967.

(SEAL)
Attest:

ERNEST W. SWIDER                         EDWARD J. BRENNEJ
Attesting Officer                            Commissioner of Patents